United States Patent Office 2,715,428
Patented Aug. 16, 1955

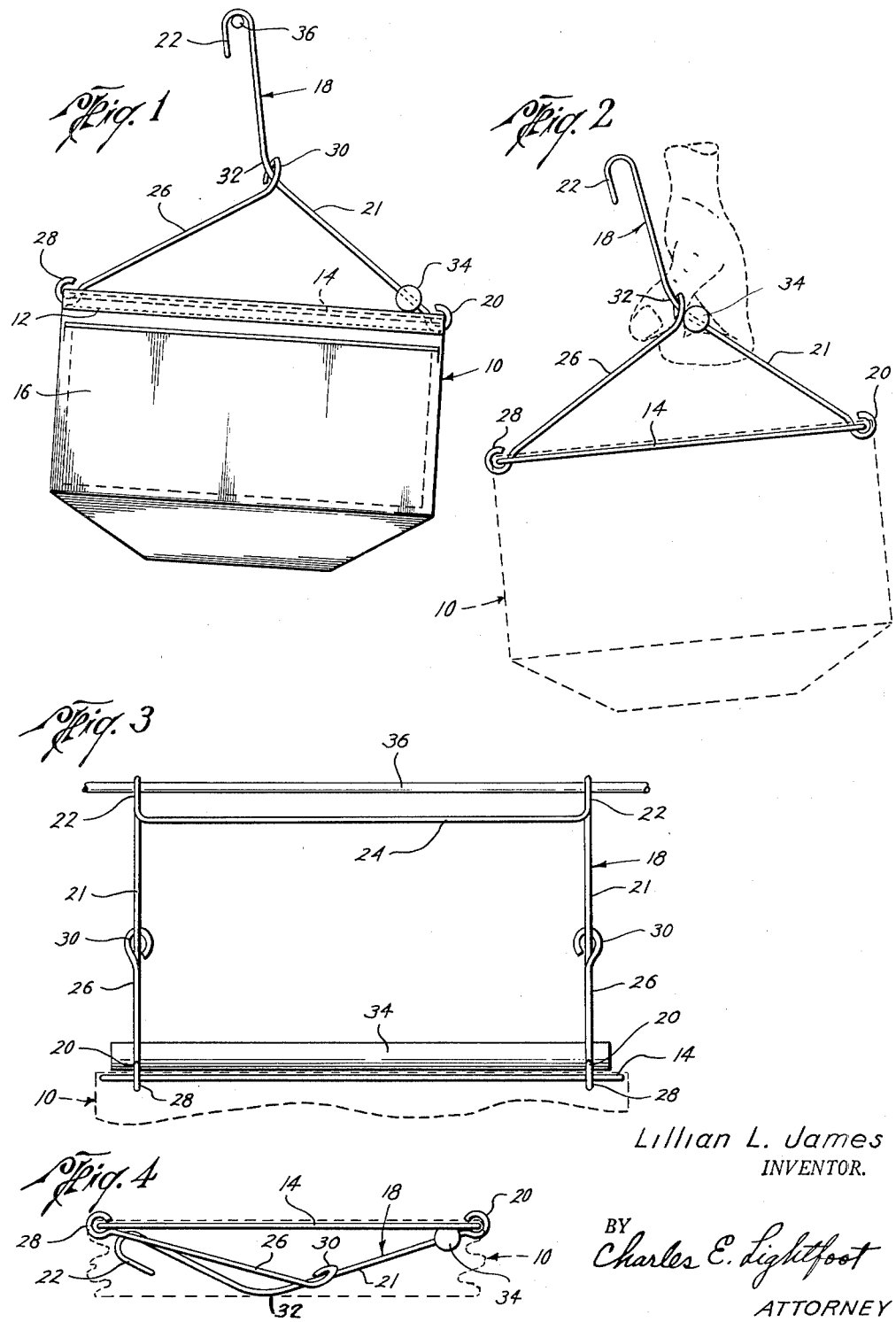

2,715,428

COLLAPSIBLE RECEPTACLE

Lillian L. James, Houston, Tex.

Application April 21, 1952, Serial No. 283,391

5 Claims. (Cl. 150—1.8)

This invention relates to a collapsible receptacle, and more particularly to a receptacle of bag-like construction which may be readily collapsed for storage in a small space and which has means adapting it for convenient carrying and for suspension from a line or similar support.

The invention finds particular application as a clothes receptacle for hanging out and taking in clothes which have been washed, and for this purpose is provided with means whereby the receptacle may be easily carried about and by which it can be suspended from a clothesline in a readily accessible position.

An important object of the invention is to provide a receptacle formed of flexible fabric having a relatively stiff rim to maintain the receptacle in a fully open condition when in use, but permitting the same to be collapsed to a flattened condition for convenient storage.

Another object of the invention is the provision of a receptacle of the type mentioned having means whereby the same may be readily suspended from a line or other similar support, and in which substantially the entire opening of the receptacle is made available for the unobstructed insertion of objects in or removal of the same from the receptacle.

A further object of the invention is to provide a receptacle of the kind referred to which is provided with a carrying handle which is at all times in position for convenient use, but which automatically moves to an out-of-the-way position where it will not obstructe the opening of the receptacle when the same is suspended from a line.

A still further object of the invention is the provision of a collapsible receptacle which is of simple design and strong construction, capable of long withstanding the hard usage and extreme conditions of exposure to dampness and weather to which such a device is likely to be subjected.

The above and other objects and advantages of the invention will best be understood from the following detailed description, constituting a specification of the same when considered in conjunction with the annexed drawings, wherein—

Figure 1 is an end elevational view of the invention showing the same suspended from a line in condition for use;

Figure 2 is a view similar to that of Figure 1, showing the manner in which the invention is used in carrying the same about;

Figure 3 is a fragmentary side elevated view showing the invention suspended from a line; and, Figure 4 is an end elevational view illustrating the invention in collapsed condition.

Referring now to the drawings in greater detail, wherein like numerals of reference are used to designate the same parts throughout the several views, the invention comprises a bag-like receptacle 10 of suitable fabric, such as heavy canvas, preferably of generally rectangular configuration, open at the top, and which may be provided with hem portions such as indicated at 12 for the reception of a frame 14 about the open top of the receptacle.

The frame 14 is preferably rectangular and formed of relatively rigid material such as wire, so that the receptacle is maintained in a fully opened condition when in use.

The bag-like receptacle may have a pocket, such as that indicated at 16 in Figure 1 on one or more of its sides for the convenient carrying of clothespins or other articles.

A hook-like suspension member 18, having the general shape of an inverted U, is attached to one side of the frame adjacent the corners thereof by eyes 20 formed at the ends of the side portions 21 of the U. This suspension member has spaced hook portions 22 formed therein which are connected by the bottom 24 of the bottom of the U, as best seen in Figure 3. Links 26 are attached at one end by eyes 28 to the frame 14 at points opposite the eyes 20 of the suspension member 18, and these links have loops 30 at their outer ends which encircle the side portions 21 of the member 18. The side portions 21 of the member 18 may also be bent mediate their ends as indicated at 32 for a purpose later to be made apparent.

The receptacle has a carrying handle 34 which may conveniently take the form of a rod of circular cross section having openings therethrough adjacent its opposite ends through which the side portions 21 of the member 18 pass. The handle 34 is freely slidable on the member 18 so that it falls to the position seen in Figure 1 when the receptacle is suspended from a line such as a clothesline indicated at 36, and may be readily raised to the position shown in Figure 2 to be grasped by the hand of the user for carrying the receptacle about.

In making use of the invention the receptacle may be filled with clothes or other articles, and by sliding the handle 34 upwardly on the member 18, the handle can be grasped to carry the receptacle. The hook portions 22 of the member 18 may then be hooked over a line or other similar support to suspend the receptacle at a convenient height to remove the contents. It will be noted that the member 18 extends well above the handle 34 when the same is in elevated position, and the hook portions 22 are so located that they may be readily hooked over a line while the receptacle is being held by the handle. As soon as the handle is released it falls to the position shown in Figure 1, thus leaving the receptacle suspended with substantially the entire open top of the receptacle unobstructed for the convenient loading or unloading of the receptacle.

When the receptacle is not in use it may be folded into the condition shown in Figure 4, wherein the U-shaped member or bail 18 and the connecting links 26 are folded down to lie within the bag 10 thus forming a relatively flat arrangement which can be stored in a small space.

It will thus be seen that the invention as described above provides a collapsible and suspendable receptacle of simple design and strong construction which may be readily filled or emptied, which is easily carried about and which occupies but little space when not in use.

The invention has been disclosed in connection with a specific embodiment of the same, but it will be understood that this is intended by way of illustration only and that numerous modifications can be made in the construction and arrangement of the various parts without departing from the spirit of the invention or the scope of the appended claims.

Having thus clearly shown and described the invention, what is claimed as new and desired to be secured by Letters Patent is:

1. In a bag, suspension means therefor including a frame adapted to be secured about the margin of the open end of the bag, a bail pivotally connected at its opposite ends to the frame and having spaced apart side portions terminating in hook shaped portions adapted to be hooked over a support, a link slidably connected to each side of the bail and having a pivotal connection with the frame at a point opposite the corresponding end of the bail, means on the sides of said bail located between the frame and said hook shaped portions positioned to engage said links to limit upward sliding movement of the links on the bail, and a handle slidably connected to the sides of the bail between said means and said frame and movable to an upper position in engagement with said links to hold the links in engagement with said means and to a lower position adjacent said frame to permit the links to slide downwardly on said sides.

2. In a bag, suspension means therefor including a frame adapted to be secured about the margin of the open end of the bag, a bail pivotally connected at its ends to the frame and having a hook portion adapted to be hooked over a support, each side of the bail having a bend mediate its ends, links pivotally connected to the frame at points opposite the ends of the bail and slidably connected to the bail, said links being engageable with the sides of the bail at said bends to limit upward movement of the links relative to the bail, and a handle slidably connected to the opposite sides of the bail below said links.

3. In a bag, suspension means therefor including a generally rectangular frame adapted to be secured about the open end of the bag, a bail pivotally connected at its ends to one side of the frame and having a hook portion adapted to be hooked over a support, each side of the bail having a bend spaced from the frame, links pivotally connected at one end to the opposite side of the frame and slidably connected at their other ends to the sides of the bail, said other ends of said links being engageable with the sides of the bail at said bends to limit upward sliding movement of said other ends on the sides of the bail, and a handle extending between and slidably carried by the sides of the bail between said frame and said other ends of said links.

4. In a bag, suspension means therefor including a generally rectangular frame adapted to be secured about the open end of the bag, a bail pivotally connected at its ends to one side of the frame and having a hook portion adapted to be hooked over a support, a link slidably connected at one end to each side of the bail below said hook portion and pivotally connected at the other end to the opposite side of the frame, and a handle extending between and slidably connected to the sides of the bail between said frame and links, said handle being movable upwardly along the bail to engage said links.

5. In a bag, suspension means therefor including a generally rectangular frame adapted to be secured about the open end of the bag, a bail pivotally connected at its ends to one side of the frame and having a hook portion adapted to be hooked over a support, a link slidably connected at one end to each side of the bail below said hook portion and pivotally connected at the other end to the opposite side of the frame, and a handle extending between and movably carried by the sides of the bail between said frame and links, said handle being movable to an active position in engagement with said links and to an inactive position in engagement with said frame.

References Cited in the file of this patent

UNITED STATES PATENTS

| Number | Name | Date |
|---|---|---|
| 666,296 | Wiard | Jan. 22, 1901 |
| 807,092 | Russell | Dec. 12, 1905 |
| 1,065,867 | Gray | June 24, 1913 |
| 1,461,802 | McRoberts | July 17, 1923 |
| 1,526,822 | Backer | Feb. 17, 1925 |
| 1,905,955 | Waehner | Apr. 25, 1933 |
| 2,617,569 | Sommer | Nov. 11, 1952 |

FOREIGN PATENTS

| Number | Country | Date |
|---|---|---|
| 60,986 | Austria | Sept. 10, 1913 |
| 719,221 | France | Feb. 3, 1932 |